May 1, 1945.   H. H. NEEDHAM   2,374,771
COMPRESSED GAS CYLINDER
Filed Dec. 3, 1942

Howard H. Needham
INVENTOR.

BY
ATTORNEY.

Patented May 1, 1945

2,374,771

UNITED STATES PATENT OFFICE 2,374,771

COMPRESSED GAS CYLINDER

Howard H. Needham, Wauwatosa, Wis., assignor to A. O. Smith Corporation, Milwaukee, Wis., a corporation of New York Application December 3, 1942, Serial No. 467,717

3 Claims. (Cl. 29—148.2)

This invention relates to compressed gas cylinders and a method of making the same.

Cylinders for the storage and transportation of gas under pressure have been constructed heretofore of solid plate discs cupped and hot-drawn to proper dimensions, or of solid forgings pierced and drawn. Cylinders of this kind have many uses, as in the supplying of gases of various kinds for industrial purposes.

One recent use of cylinders of this kind has been for oxygen tanks in substratosphere flying to supply oxygen to pilots and the like. In combat service of war, such tanks are liable to be hit by bullets or flying fragments.

The relatively high working stress in the cylinders and the high pressure of the gaseous contents sometimes results in an explosion when the cylinder is hit or injured.

Cylinders of the former construction fragment in exploding, so that the life of those nearby is endangered. Attempts have been made to prevent shattering of cylinders by constructing them of various alloys and applying various types of heat-treatment thereto.

In the manufacture of large heavy-walled pressure vessels for the chemical and process industries, it has been known for some time that a multi-layer wall construction is stronger and has less tendency to fragment upon rupture than a single plate wall construction. Such advantages, however, were thought to be present only with relatively thick walls, in excess of one inch, and with low ratios of diameter to thickness. Consequently, heretofore, the commercial manufacture of multi-layer vessels has been applied to very thick large-sized vessels that are normally stationary.

The present invention is based upon the realization that multi-layer construction can be applied in the manufacture of the ordinarily portable gas cylinders of relatively thinner wall, and that such cylinders will be less liable to shatter when punctured and will be safer for many uses.

The principal object of the invention is to provide a safer and more shatterproof gas cylinder.

Another object of the present invention is to provide a multi-layer tank adapted for the purposes described.

Another object is to provide a practical method of making multi-layer gas cylinders.

Another and more general object is to provide a gas cylinder that has less tendency to shatter when ruptured.

Another object is to provide a better multi-layer tank and a better method of making such tanks.

The invention is illustrated in the accompanying drawing in which.

Figure 1:
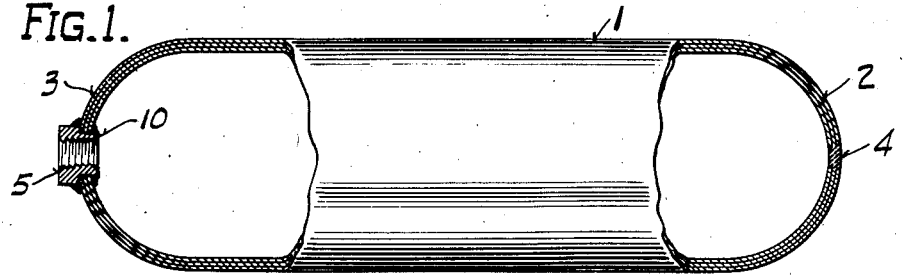
Figure 1 is a side elevation of a tank partially in section.

The tank has a cylindrical body 1 of multi-layer construction with integral curved ends 2 and 3 formed as by electrical forming from the same members that constitute the body. One end 2 is preferably closed and welded at its central point 4. The other end 3 is provided with a threaded spud 5 welded into the central opening therethrough.

The layers of the structure are continuous and are in close uniform surface contact throughout so that they readily transmit working load from the inner layer to the outer layer and provide a frictional engagement between the layers that prevents fragmentation.

The number of layers may be varied, the container illustrated having three layers, each about one-sixteenth of an inch in thickness. Other thicknesses may be employed for the layers depending upon the total wall thickness desired and the number of layers employed.

Figure 2:
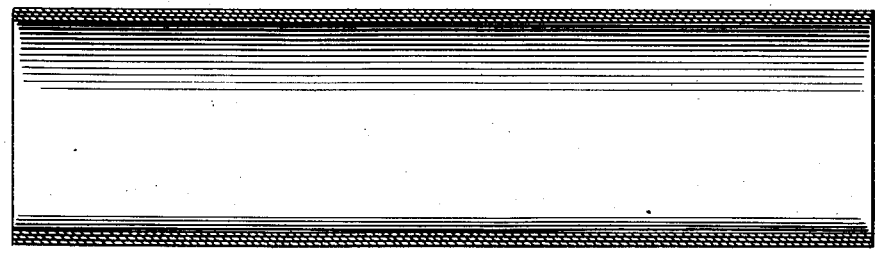
Fig. 2 is a longitudinal section through a series of superimposed cylindrical layers preparatory to forming the container.

The cylindrical blank illustrated in Fig. 2 and from which the container is constructed may be fabricated by slipping a plurality of thin seamless cylindrical members of different relative diameters one within another. The several layers are then tightened upon one another by reducing at least the outer ones in diameter.

This reduction operation is preferably performed by the general process set forth in the copending application of Sven Westin, Serial No. 463,957, filed November 30, 1942, for Method and apparatus for electrically forming pipe, and in which one end of the blank is gripped by a chuck 6 which rotates the blank on its axis while feeding the other end through tapered electrode dies 7 constructed to apply electric resistance heating current to that portion of the blank in contact therewith. The general principles of the process are set forth in the United States Letters Patent No. 2,309,561, granted January 26, 1943, to Axel Westin and Sven Westin, for improvement in Method of treating metallic bodies.

Figure 3:
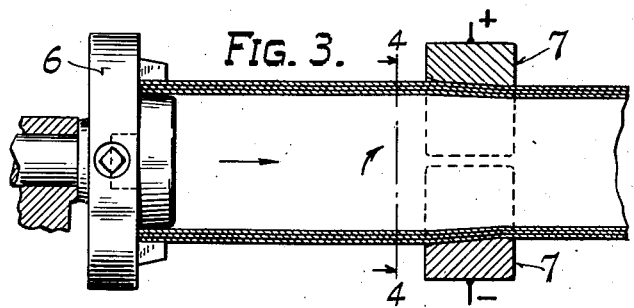
Fig. 3 is a similar section showing the compressing of the several layers together.
Figure 4:
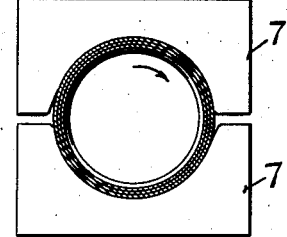
Fig. 4 is a transverse section taken on line 4—4 of Fig. 3.

The blank is formed as illustrated in Figs. 3 and 4, in dies 7 progressively from one end to a point near the chuck 6 at the other end, the latter point being beyond the final cylindrical body portion of the container so that the body 1 is of uniform diameter with the layers all compressed together and constituting a truly multi-layer structure. Other methods may be employed for obtaining tightness of the layers.

The blank is then removed from the first forming machine and inserted in a second forming machine where one end is gripped by a rotary chuck 8 which rotates the blank and feeds its other end into a die cavity in the electrode dies 9. The latter are spaced apart to apply electric resistance heating current to the blank as the latter contacts therewith, and have a die cavity of the general hemispherical shape of the finished tank end. As the end of the blank first contacts with the dies 9, heating current softens the end of the rotating blank and the latter yields inwardly under the pressure of the dies as the blank feeds forward. This inward yielding progresses until the end of the blank is substantially closed. The end is then bored out and a spud 5 is secured therein by welding.

Figure 7:
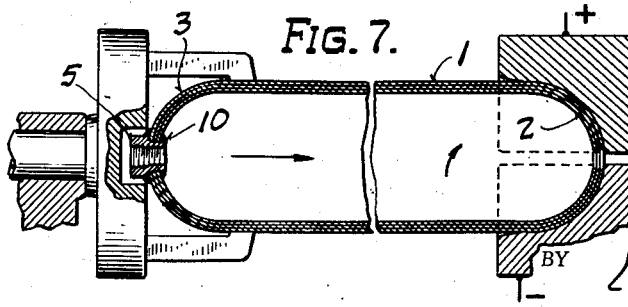
Fig. 7 is a view similar to Fig. 5 showing the closing of the opposite end of the structure.

Then the blank is reversed in the machine with a different chuck and the other end closed, as illustrated in Fig. 7. The latter end may be securely closed by welding as at 4 to strengthen the closure. While the spud 5 may be welded in either end, from a practical standpoint, the spud should be secured in the first formed end prior to closing of the opposite end so that the flange 10 of the spud may be welded to the inner layer of the structure and seal the same against loss of contents.

The completed container has continuous walls of multi-layer construction without circumferential joints near the knuckle radius of the ends. The layers are in close frictional contact with one another and the flexibility of the structure enables it to withstand high internal pressures without the danger of fragmentation.

In the fabrication of the multi-layer cylindrical blank from which the container is formed, it is possible to employ the method set forth in the United States Letters Patent to Richard Stresau, No. 1,925,118, granted September 5, 1933. In this construction the layers are formed from rolled sheet metal and each is welded along a longitudinal seam to form the cylinder. The welded seams may be either spaced from one another circumferentially in the final structure or they may be made to coincide to constitute a common or single weld.

Where the seams are spaced around the circumference, the inner layer is first formed by bending a metal sheet into a cylinder of the required dimensions and welding it along the longitudinal meeting edges. The subsequent layers may be similarly formed and welded and then slipped over the first with the seams staggered preparatory to tightening the layers together as by the process illustrated in Figs. 3 and 4.

This subsequent tightening of the layers may be avoided where the structure is fabricated in the manner more specifically described in the Stresau patent above referred to, in which each subsequent layer is applied separately to the inner layer or layers and held tightened thereon as by tension bands during welding.

Where the longitudinal seams are made to coincide, the layers may be applied and welded as just described, but with the seams in radial alignment, or all of the layers may be assembled prior to welding and the welding operation effect a simultaneous welding thereof. Electric arc welding is preferably employed.

Figure 5:
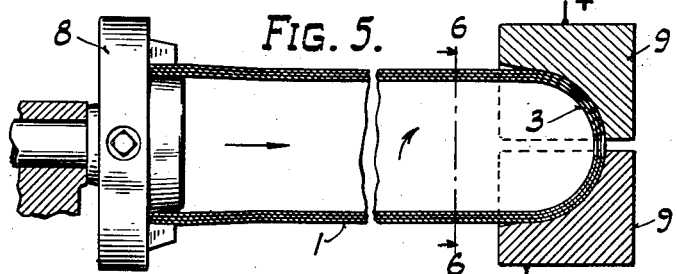
Fig. 5 is a longitudinal section showing the closing of the end of the structure.
Figure 6:
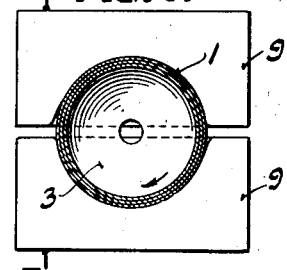
Fig. 6 is a transverse section taken on line 6—6 of Fig. 5.

After the cylindrical blank is produced as described, its ends are formed to close the container as illustrated in Figs. 5, 6 and 7, and previously described herein.

The invention may have various embodiments within the scope of the accompanying claims.

I claim:

1. A high pressure portable oxygen cylinder or the like resistant to fragmentation from external impact when highly stressed with internal fluid pressure, comprising a container body of multi-layer construction throughout and in which the end closures are formed from the same metal sheets as the body section to a substantially semi-spherical shape with the layers retained substantially separate from one another and in close contact throughout the meeting surfaces of one another to provide for frictional relief upon rupture, each said layer being in one piece and continuous throughout the length of the cylinder, and said layers being welded together only at the central point of each end closure and being otherwise unattached to one another, and there being a spud welded into at least one of the end closures in the center of the latter, the weld serving to seal the spud to the innermost layer, and the structure being devoid of circumferential and longitudinal welds joining the several layers to one another.

2. In the manufacture of multi-layer high pressure vessels for resistance to fragmentation from external impact when highly stressed with internal fluid pressure, the steps of fabricating a plurality of cylindrical tubular members of successively different diameters providing for the slipping of one within another, assembling said members one over another in substantially concentric relation, hot forming the structure inwardly to bring the members into tight surface contact throughout in the region of the cylindrical body of the vessel, hot forming each end of the structure radially inward to substantially close the same, and welding the several members together at the center of the respective end closures, said welding operation at at least one end serving to secure a spud axially of the structure.

3. In the manufacture of multi-layer high pressure vessels for resistance to fragmentation from external impact when highly stressed with internal fluid pressure, the steps of fabricating a plurality of cylindrical tubular members of successively different diameters providing for the slipping of one within another, assembling said members one over another in substantially concentric relation, hot forming the structure inwardly to bring the members into tight surface contact throughout in the region of the cylindrical body of the vessel, hot forming one end of the structure radially inward to substantially close the same, inserting a spud centrally in said end closure, welding said spud in place to said members and thereafter similarly hot forming the other end of the structure radially inward to substantially close the same, and welding the several members together at the center of the end closure.

HOWARD H. NEEDHAM.